US 8,751,642 B2

(12) United States Patent
Vargas et al.

(10) Patent No.: US 8,751,642 B2
(45) Date of Patent: Jun. 10, 2014

(54) METHOD AND SYSTEM FOR MANAGEMENT OF SAMPLED TRAFFIC DATA

(75) Inventors: Jorge Arturo Sauma Vargas, San Jose (CR); Francisco Jose Rojas Fonseca, San Jose (CR); Diego Valverde Garro, San Jose (CR); Andres Odio Vivi, Heredia (CR); David Corrales Lopez, San Jose (CR)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 13/260,181

(22) PCT Filed: Jan. 31, 2010

(86) PCT No.: PCT/US2010/022684
§ 371 (c)(1),
(2), (4) Date: Sep. 23, 2011

(87) PCT Pub. No.: WO2011/093898
PCT Pub. Date: Aug. 4, 2011

(65) Prior Publication Data
US 2012/0030352 A1       Feb. 2, 2012

(51) Int. Cl.
*G06F 15/173*       (2006.01)
*H04L 12/26*       (2006.01)

(52) U.S. Cl.
CPC .................... *H04L 43/022* (2013.01)
USPC ........................................ 709/224

(58) Field of Classification Search
CPC .................................... H04L 43/022
USPC .................................. 709/234, 224
See application file for complete search history.

(56) References Cited

U.S. PATENT DOCUMENTS

| | | | |
|---|---|---|---|
| 5,812,529 A | * | 9/1998 | Czarnik et al. ............... 370/245 |
| 7,512,980 B2 | | 3/2009 | Copeland et al. |
| 2007/0064617 A1 | | 3/2007 | Reves |
| 2009/0016236 A1 | | 1/2009 | Alcala et al. |

OTHER PUBLICATIONS

"ZoneRanger: Secure NetFlow / sFlow Proxy"; Tavve; http://www.tavve.com/index.php/literature/marketnotes/73-netflow-sfflow; 1 page.

A. Kobayashi., et al.; Method of Measuring VoIP Traffic Fluctuation with 1-15 Selective sFlow, 2007 International Symposium on Applications and the Internet Workshop, Jan. 15-19, 2007, ISBN: 0-7695-2754-4 See Sections 5 and 6.

P. Phaal, et al.; "RFCJ176—InMon Corporatin's sFlow: A Method for 1-15 Monitoring Traffic in Switched and Routed Networks"; Sep. 2001 See Sections 2-4.

PCT; "Notification of Transmittal of the International Search Report and the Written Opinion of the International Searching Authority, or the Declaration" in PCT/US2010/022684; mailed Oct. 28, 2010; 10 pages.

* cited by examiner

*Primary Examiner* — Vivek Srivastava
*Assistant Examiner* — Gary Dennis (57) ABSTRACT

A method for management of sampled traffic data is described herein. For each network device of a plurality of network devices, one or more data sources of the network device is determined. Each of the one or more data sources is associated with a local identifier. A sampler proxy receives a sampling configuration from a data collector, The sampling configuration includes a selection of a data source of a network device of the plurality of network devices. The selected data source is identified by a global identifier. The sampling configuration is translated to a local sampling configuration and is provided to the selected data source.

15 Claims, 10 Drawing Sheets

METHOD AND SYSTEM FOR MANAGEMENT OF SAMPLED TRAFFIC DATA

I. BACKGROUND

A possible method for collecting data for network analysis is known as sFlow. As described in RFC-3176, sFlow is a technology designed for network monitoring based on packet sampling. sFlow operates by randomly sampling one out of every "n" data packets at a network device such as a switch, router, wireless access point, etc. The packet header, interface counters, and additional packet information are collected by an sFlow agent residing on the network device. The sFlow agent forwards the captured information to an sFlow collector for processing. For example, an sFlow agent may sample an interface, generate information about the network traffic, and send the information to an sFlow collector, which then analyzes the information.

An sFlow collector typically establishes direct communication with each of the network devices. An sFlow agent may be running on a network device that is controlled by a controlling device (e.g., a wireless controller) or behind a filtering device (e.g., a firewall). In such instances, the control traffic of the sFlow collector may go through a firewall, but the sampled traffic may not be permitted to travel back to the sFlow controller. Moreover, when the sFlow agents are directly and individually configured and communicate to the sFlow controller through the controlling device, the sFlow collector may discard the sampled traffic data, thereby losing potentially relevant information that could have otherwise been used for network management.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

Packet sampling may be used to monitor network traffic. In genera flow-based traffic monitoring systems include a sampling agent which resides on a network device and which forwards to data collectors information about the network traffic going through the network device. Various network management protocols may be implemented that enable the sampled traffic data to be gathered. Examples of the network management protocol may include, but are not limited to, sFlow, NetFlow, and IPFIX. As used herein, sampled traffic data includes statistical packet-based sampling of switched flows (e.g., flow samplers) and time-based sampling of network interface statistics (e.g., counter polling).

In one embodiment, a sampler proxy is arranged between sampling agents and data collectors, enabling the sampled traffic data to be forwarded through intermediate devices, such as a controller or filtering device. Moreover, a method for management of sampled traffic data is described herein. For each network device of a plurality of network devices, one or more data sources of the network device is determined. Each of the one or more data sources is associated with a local identifier. A sampler proxy receives a sampling configuration from a data collector. The sampling configuration includes a selection of a data source of a network device of the plurality of network devices. The selected data source is identified by a global identifier. The sampling configuration is translated to a local sampling configuration and is provided to the selected data source.

Figure 1:
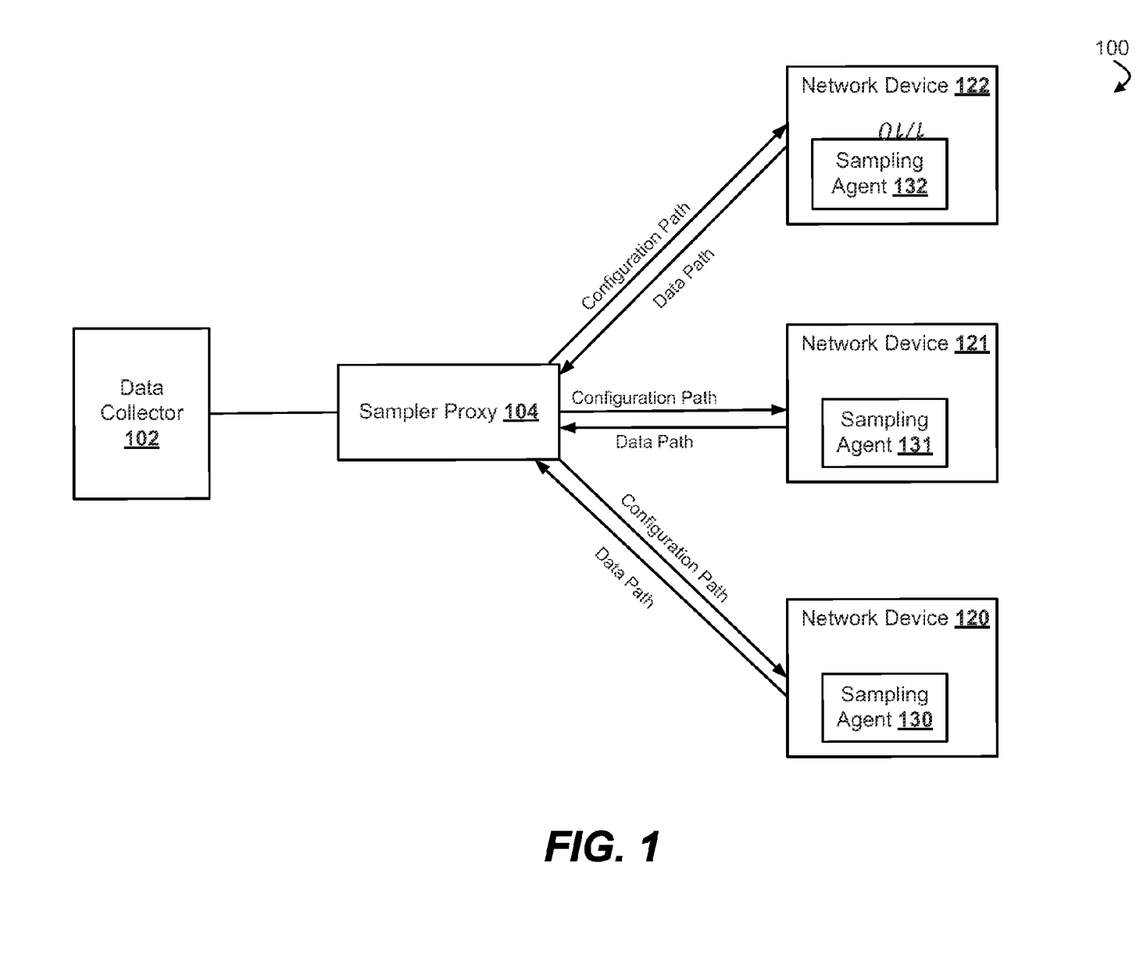
FIG. 1 is topological block diagram of a network system in accordance with an embodiment of the invention.

FIG. 1 is topological block diagram of a network system 100 in accordance with an embodiment of the invention. System 100 includes a data collector 102, a sampler proxy 104, network device 120 including sampling agent 130, network device 121 including sampling agent 131, and network device 122 including sampling agent 132.

Data collector 102 is configured to generate one or more configurations including configurations for flow samplers and counter pollers, receive datagrams from one or more sampling agents, and analyze datagrams. Data collector 102 is operatively coupled to sampler proxy 104. The connection between data collector 102 and sampler proxy 104 may include multiple network segments, transmission technologies and components. Data collector 102 may be arranged in a local network or secure network. As used herein, a local network is a data network that is directly accessible by data collector 102.

Sampler proxy 104 is operatively coupled to data collector 102 and is operatively coupled to network devices 120-122 via communication channels including a configuration path and a data path. The connection between data collector 102 and sampler proxy 104, and sampler proxy 104 and network devices 120-122 may include multiple network segments, transmission technologies and components.

Sampler proxy 104 is configured to interface between data collectors and sampling agents and initialize an aggregation of multiple interfaces of various network devices into a single network device. Sampler proxy 104 may be implemented where a central device is the administrator of a group of devices and/or implemented on network devices that separate one network segment from another. For example, sampler proxy 104 may be implemented as a standalone device, on a firewall, wireless controller, and the like, separating a local network from a remote network. As used herein, a remote network is a data network which contains remote network devices that may or may not be directly accessible by a data collector, such as data collector 102.

Network devices 120-122 are operatively coupled to sampler proxy 104. Network devices 120-122 are configured to forward sampled traffic data, for example, according to a sampling configuration received by a sampler proxy. Network devices may include network equipment, such as a switch or router. Network devices 120-122 may be a group of devices, such as wireless access points, that are controlled by a central device, such as a wireless controller. In another embodiment, network devices 120-122 may be located in a remote network.

Network device 120 includes sampling agent 130, network device 121 includes sampling agent 131, and network device 122 includes sampling agent 132.

Sampling agents 130-132 are embedded within a network device and are configured to provide an interface for configuring sampling instances within a network device. Sampling configurations may be associated with a network management protocol and/or sampling standard, such as, but not limited to sFlow, Netflow, or etc. Each of these standards yield sample packet data in a specified format that may differ from one standard to another. Sampling agents 130-132 are configured to use two forms of sampling: statistical packet-based sampling of network traffic (e.g., flow samplers) and time-based sampling of network interface statistics (e.g., counter pollers). For example, the sampling agents 130-132 sample 1 in N packets, where N can be set by the manufacturer or configured by a user (e.g., a network administrator). The particular sampling protocol employed in network devices 120-122 may depend upon the make or model of the network device. For example, an HP® ProCurve switch may employ the sFlow standard. Sampling agents 130-132 may be centrally configured through sampler proxy 104. This configuration can be command line based configuration and/or Simple Network Management Protocol (SNMP) based configuration.

Sampling agents 130-132 are configured to generate sampled traffic data and provide the sampled traffic data to sampler proxy 104. The sampled traffic data may be comprised of datagrams or other units of data that include traffic information (e.g., flow samplers, counter pollers, etc.) obtained from the sampled packets.

In operation, sampler proxy 104 is configured to initialize an aggregation of multiple data sources and/or sampling/polling instances of various network devices into a single network device by mapping the data source identifiers of the various network devices, such as network devices 120-122, to global identifiers. The global identifier ensures that each of the data sources of the network devices 120-122 is uniquely identifiable. As used herein, a data source is a location within a network device that can make traffic measurements. For example, data sources include interfaces, virtual interfaces, physical entities within the network device such as the backplane, VLANs, antennas, Ethernet connections, and other data sources. Each data source may have access to a subset of the network traffic flowing through the network device. In one embodiment, a data source is defined for each physical interface on the device, ensuring that every packet transiting the network device is observed. As used herein a sampling instance is a process for sampling 1:N packets of the traffic going through a data source. The sampling instance may send the header contents and a part of the sampled packet payload to a data collector. There may be one or more sampling instances associated with a single data source. Each sampling instance operates independently from other instances. As used herein a poling instance periodically sends traffic statistics for a given data source. For example, traffic statistics includes the amount of inbound traffic, errors, outbound traffic, status, etc.

When data collector 102 embarks on a configuration process of a specific data source, data collector 102 may accomplish such configuration via sampler proxy 104. From the perspective of a data collector, such as data collector 102, sampler proxy 104 provides multiple data sources. As such, rather than performing configuration processes between each of network devices 120-122 in which the various data sources are embedded, data collector 102 interacts with a single network device, e.g., sampler proxy 104. Sampler proxy 104 translates and forwards the configuration to the correct network device and data source. The existence of the network devices 120-122 is transparently hidden by sampler proxy 104.

From the perspective of the network devices 120-122, sampler proxy 104 is configured to act as a collector. When a network device sends sampled traffic data through a data path, the sampled traffic data is sent to sampler proxy 104 as if sampler proxy 104 is the final data collector. Sampler proxy 104 translates sampled traffic data and forwards the sampled traffic data to the correct collector. Although direct communication remains feasible, sampler proxy 104 may be the interface for communication (e.g., via configuration path and data path) between sampling agents and data collectors. In one embodiment, sampler proxy 104 routes, but does not analyze or store, the sampled traffic data.

Sampler proxy 104 allows sampled traffic data to be obtained from network devices that are being controlled by third-party devices, from network devices that are outside of a firewall, or in insecure zones, without individually configuring each data collector with a sampling agent. Rather, a single configuration with sampler proxy 104 may achieve the same. As such, sampler proxy 104 provides centralized management of the data sources of multiple network devices.

Figure 2:
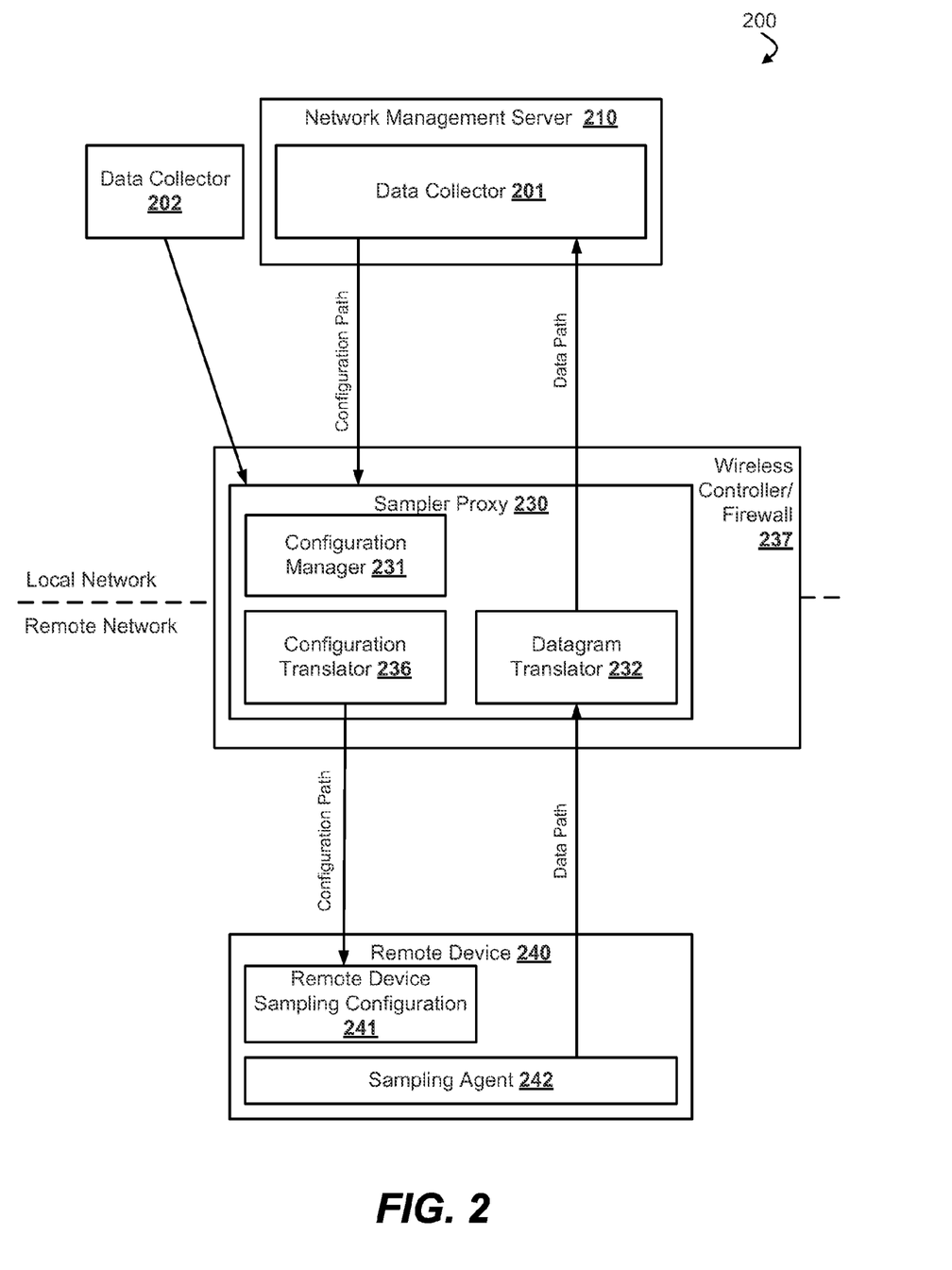
FIG. 2 is another topological block diagram of a network system in accordance with an embodiment of the invention.

FIG. 2 is another topological block diagram of a network system in accordance with an embodiment of the invention. System 200 includes a network management server 210, data collector 202, wireless controller or firewall 237 including a sampler proxy 230, and remote device 240. Network management server 210 and data collector 202 are arranged in a local network. Remote device 240 is arranged in a remote network. Wireless controller or firewall 237 is arranged between the local network and the remote network.

Network management server 210 is operatively coupled to wireless controller or firewall 237. Network management server 210 is configured to manage, monitor, and/or deploy a network. The connection between network management server 210 and wireless controller or firewall 237 may include multiple network segments, transmission technologies and components. Network management server includes data collector 201.

Data collector 201 and data collector 202 are configured to generate one or more configurations including configurations for flow samplers and counter pollers, receive datagrams from one or more sampling agents, and analyze datagrams. Data collector 201 and data collector 202 are operatively coupled to sampler proxy 230 via wireless controller or firewall 237. The connection between data collectors 201-202 and sampler proxy 230 may include multiple network segments, transmission technologies and components.

Wireless controller or firewall 237 is operatively coupled to data collector 201 via network management server 210, data collector 202, and remote device 240. Wireless controller or firewall 237 includes sampler proxy 230.

Sampler proxy 230 is operatively coupled to data collector 201 via network management server 210, data collector 202, and remote device 240. Sampler proxy 230 is configured to interface between data collectors and sampling agents, manage the configuration of sampling agents, and manage the routing of sampled traffic data. Sampler proxy 230 includes a configuration manager 231, a configuration translator 236, and a datagram translator 232.

Configuration manager 231 is configured to initialize an aggregation of multiple data sources of various network devices into a single network device. Initialization may be performed by mapping one global identifier (e.g., global interface index) to each data source of each device available to sampler proxy 230.

Configuration translator 236 is configured to translate a sampling configuration to the specific settings of the intended recipient (i.e., remote device). This may be accomplished by translating the sampling configuration to a local sampling configuration and routing the local configurations through a configuration path to the correct remote device.

Datagram translator 232 is configured to translate a local sampling datagram into a global sampling datagram, and route sampled traffic data to the correct data collector through a data path.

Remote device 240 is operatively coupled to sampler proxy 230 and is configured to forward sampled traffic data through a data path. Remote device 240 includes remote device sampling configuration 241 and sampling agent 242.

Remote device sampling configuration 241 is configured to receive a local sampling configuration through a configuration path and implement sampling configurations, for example by setting flow samplers and/or counter pollers based upon the local sampling configuration.

Sampling agent 242 is configured to provide an interface for configuring sampling instances within a network device and sample packets according to the sampling configurations.

In operation, one or more of data collectors 201 and 202 may send a request to configure remote devices for delivering sampled traffic data. Sampler proxy 230 may access the configuration on behalf of the remote devices, such as remote device 240. Sampler proxy may modify the configuration to accommodate the specific network environment of each of the remote devices that are to be configured. As such, sampler proxy manages the configuration of various sampling agents of various remote devices.

In one embodiment, data collectors 201 and 202, which are arranged in a local network, do not directly access remote network devices which are behind a firewall. Instead, data collectors 201 and 202 access sampler proxy 230, thus avoiding the remote network and a potential security gap in the local network.

Once configured, the remote devices deliver sampled traffic data to sampler proxy 230, which accesses the sampled traffic data on behalf of one or more data collectors. The traffic datagrams may be modified and routed to the appropriate data collector by sampler proxy 230.

The present invention can also be applied in other network topologies and environments. Network 200 may be any type of network familiar to those skilled in the art that can support data communications using any of a variety of commercially-available protocols, including without limitation TCP/IP, SNA, IPX, AppleTalk, and the like. Merely by way of example, system 200 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Initialization

Figure 3:
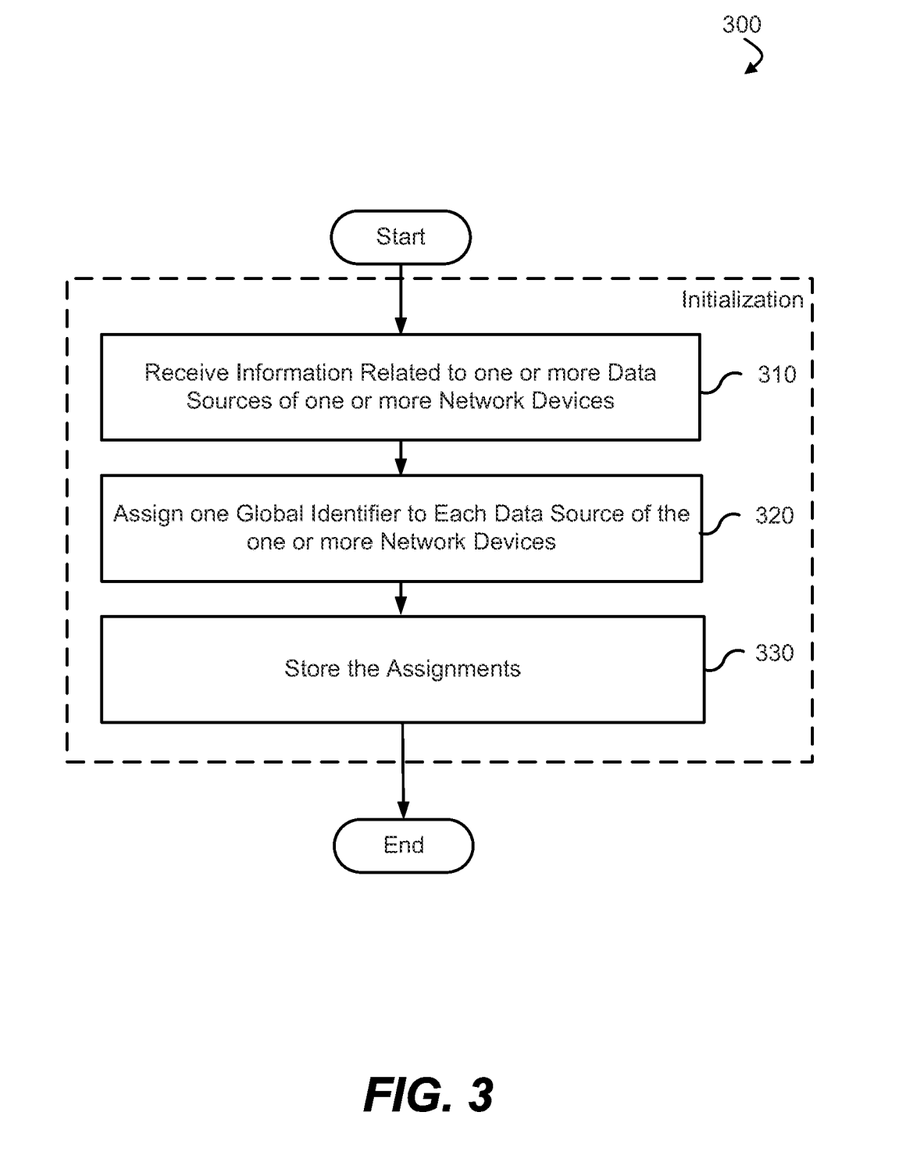
FIG. 3 is a process flow diagram for initialization of sampling agents in accordance with an embodiment of the invention.

FIG. 3 is a process flow diagram for initialization of sampling agents in accordance with an embodiment of the invention. The depicted process flow 300 may be carried out by execution of one or more sequences of executable instructions. In another embodiment, the process flow 300 is carried out by components of a sampler proxy, an arrangement of hardware logic, e.g., an Application-Specific Integrated Circuit (ASIC), etc. For example, one or more steps of process flow 300 may be performed by a configuration manager of a sampler proxy, such as configuration manager 231.

In one embodiment, for each network device that is detected by a sampler proxy, a global identifier is determined when the sampler proxy adopts the network device as a sampling agent. At step 310, information related to one or more data sources of one or more network devices is received. In particular, a network device may be detected. A request may be sent to the network device to provide information about its data sources. A network device may have multiple data sources. The information provided may include a local identifier (e.g., local ifindex) of each data source.

At step 320, one global identifier is assigned to each of the data sources of the one or more network devices. The global identifiers are globally unique across all devices operatively coupled to the sampler proxy. In one embodiment, the global identifier may be generated based on the MAC address of the network device that includes the data source and/or the local identifier.

Figure 4:
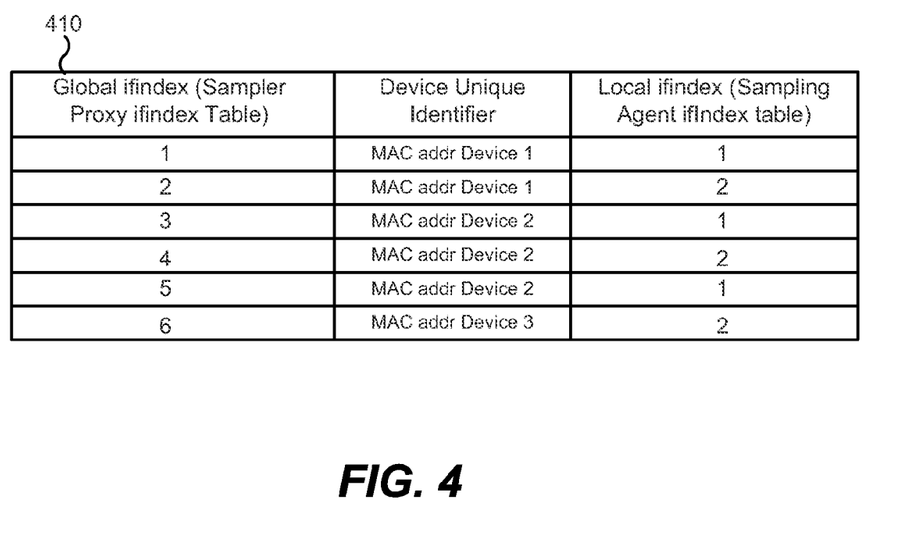
FIG. 4 is a mapping table in accordance with an embodiment of the invention.

At step 330, the assignments of the global identifiers to local identifiers are stored. In one embodiment, the assignments are stored in a table, such as mapping table 410. As such each available data source is associated with an identifier that is unique to all devices under the purview of the controller or firewall in which the sampler proxy resides.

FIG. 4 is a mapping table 410 in accordance with an embodiment of the invention. The information contained in mapping table 410 may be pertinent to a particular sampler proxy. As shown, mapping table 410 includes a global identifier (e.g., global interface index, denoted global ifindex) column, a device unique identifier (ID) column, and a local identifier (e.g., local interface index, denoted local ifindex) column. Each row of table 410 represents a data source available to a sampler proxy. The data source may be remote and/or local to the device that includes the sampler proxy.

The device unique ID column may be populated with, for example, network addresses (e.g., MAC address) of remote devices in which the data sources are embedded. Other forms of unique identification of the remote device may also be used.

A single device unique ID is not sufficient to uniquely represent multiple data sources of a device. The local identifier may be employed in addition to a device identifier to distinguish among the data sources. Each data source is associated with a local identifier. The local identifier column includes a local identifier that is unique to the network device that includes the data source. As previously described, remote network devices may include a plurality of data sources. As shown, remote devices 1-3 all include two data sources, wherein each data source of the remote device is identified by an index (i.e., local ifindex) that is unique to the remote device. However, the local identifiers are not unique across all remote devices in table 410.

The global identifier column includes indexes that are globally unique across all devices operatively coupled to the sampler proxy. The global identifier allows any data collectors operatively coupled to the sampler proxy to view the sampler proxy as an aggregation of multiple data sources into a single network device.

Discovery and Configuration

Figure 5:
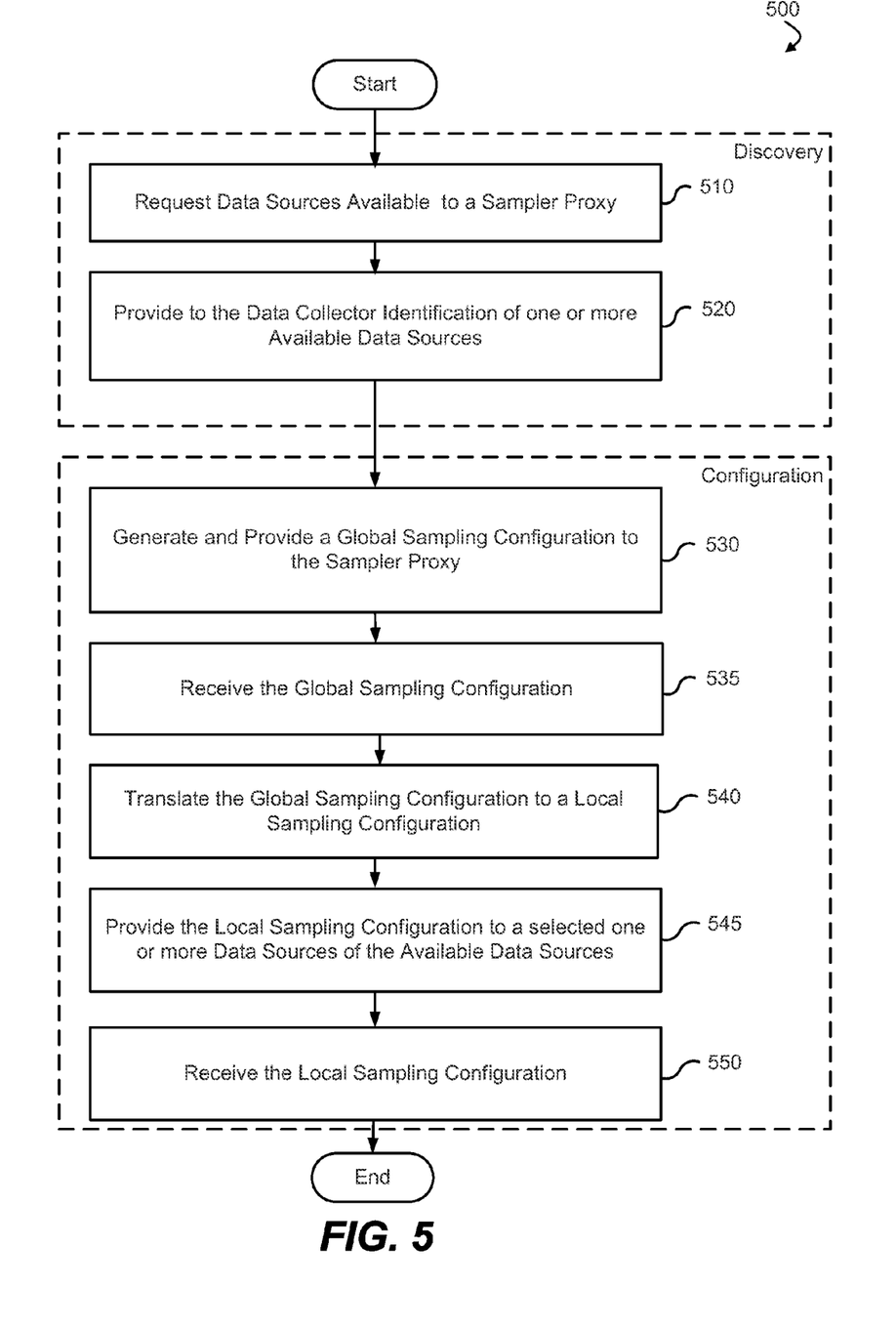
FIG. 5 is a process flow diagram for discovery and configuration of a sampling agent in accordance with an embodiment of the invention.

FIG. 5 is a process flow diagram for discovery and configuration of a sampling agent in accordance with an embodiment of the invention. The depicted process flow 500 may be carried out by execution of one or more sequences of executable instructions. In another embodiment, the process flow 500 is carried out by an arrangement of hardware logic, e.g., an Application-Specific Integrated Circuit (ASIC), etc.

At step 510, a request for data sources available to a sampler proxy is made. For example, a data collector may connect to the sampler proxy. The data collector may send the request to the sampler proxy.

At step 520, identification of one or more data sources available to the sampler proxy are provided to the collector. The sampler proxy may return a list of global identifiers (e.g., global ifindexes) that were assigned to data sources of one or more sampling agents during an initialization process. From the perspective of the data collector, the global identifiers appear to indicate that the data sources are all from the same device, i.e., the sampler proxy.

The data sources may be configured. At step 530, a global sampling configuration is generated and provided to the sampler proxy. In particular, one or more flow samplers and/or counter pullers associated with a data source of the available data sources may be configured to generate a global sampling configuration. In one embodiment, the global sampling configuration is generated by the data collector. It should be recognized that no modifications are made to a standard data collector in order to generate the global sampling configuration. The global sampling configuration includes a selection of one or more of the available data sources upon which the configuration is tagged to be applied. The selected one or more data sources are identified using the corresponding global identifiers. In one embodiment, the global sampling configuration is sent to the sample proxy using the Simple Network Management Protocol (SNMP). Various other protocols may be implemented.

The global sampling configuration is received, for example by the sampler proxy, at step 535. At step 540, the global sampling configuration is translated to a local sampling configuration. Configuration translation is described in further detail with regard to FIG. 6. The local sampling configuration is provided to the selected one or more data sources of the available data sources, at step 545. For example, a device unique identifier, such as a MAC address of the network device associated with a selected data source, is used in conjunction with a local identifier (e.g., local ifindex) to send the local sampling configuration to the correct data source.

At step 550, the local sampling configuration is received by the selected one or more data sources. Flow samplers and/or counter pullers may be set based upon the local sampling configuration.

Configuration Translation

Figure 6:
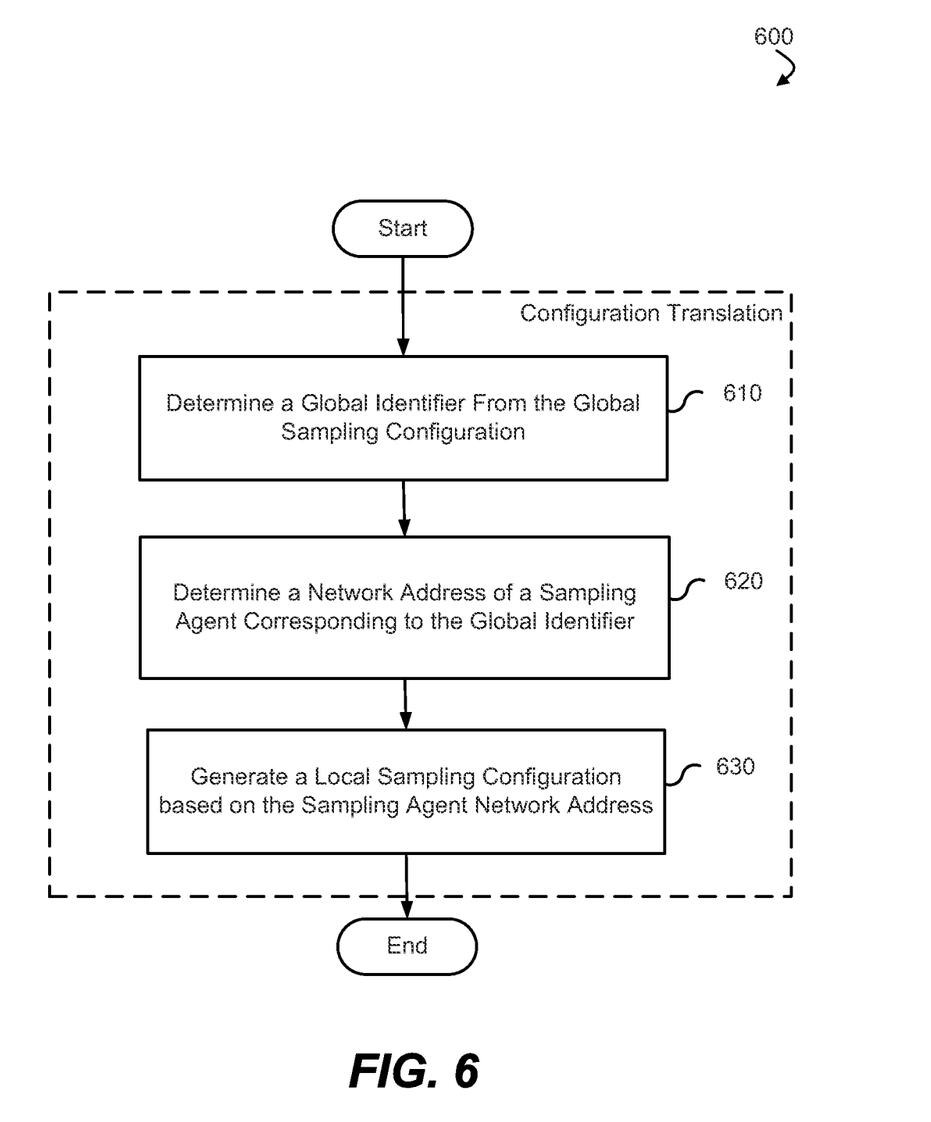
FIG. 6 is a process flow diagram for configuration translation in accordance with an embodiment of the invention.

FIG. 6 is a process flow diagram for configuration translation in accordance with an embodiment of the invention. The depicted process flow 600 may be carried out by execution of one or more sequences of executable instructions. In another embodiment, the process flow 600 is carried out by components of a sampler proxy, an arrangement of hardware logic, e.g., an Application-Specific Integrated Circuit (ASIC), etc.

At step 610, a global identifier (e.g., global ifindex) is determined from the global sampling configuration. As previously described, the global sampling configuration includes a selection of one or more of the available data sources. The selected one or more data sources are identified using the corresponding global identifier. In one embodiment, the global identifiers are extracted from the global sampling configuration.

At step 620, a network address of a sampling agent corresponding to the global identifier is determined. In one embodiment, the global identifier is used as a key into a table mapping global identifiers to sampling agent network addresses. For example, a global ifindex may be used as a key to search mapping table 410. The device unique identifier (e.g., MAC address, serial number, etc.) and local identifier (e.g., local ifindex) corresponding to the global identifier may be used to determine the sampling agent network address.

A local sampling configuration may be generated based on the sampling agent network address, at step 630. The global sampling configuration includes the network address of the sampler proxy and the global identifier. To generate the local sampling configuration, the network address of the sampler proxy is replaced with the network address of the device determined at step 620. As such, the sampling configuration identifies the correct network device. To get the sampling configuration to the correct data source of the correct network device, the global identifier in the global sampling configuration is replaced with the local identifier determined at step 620. Therefore, the local sampling configuration includes the device unique identifier and the local identifier corresponding to the global identifier.

Datagram Reception and Translation

Once configuration is completed, various remote network devices may begin to provide sampled traffic data to the correct data collectors through a sampler proxy via a data path. It should be recognized that data paths and configuration paths are independent from each other.

Figure 7:
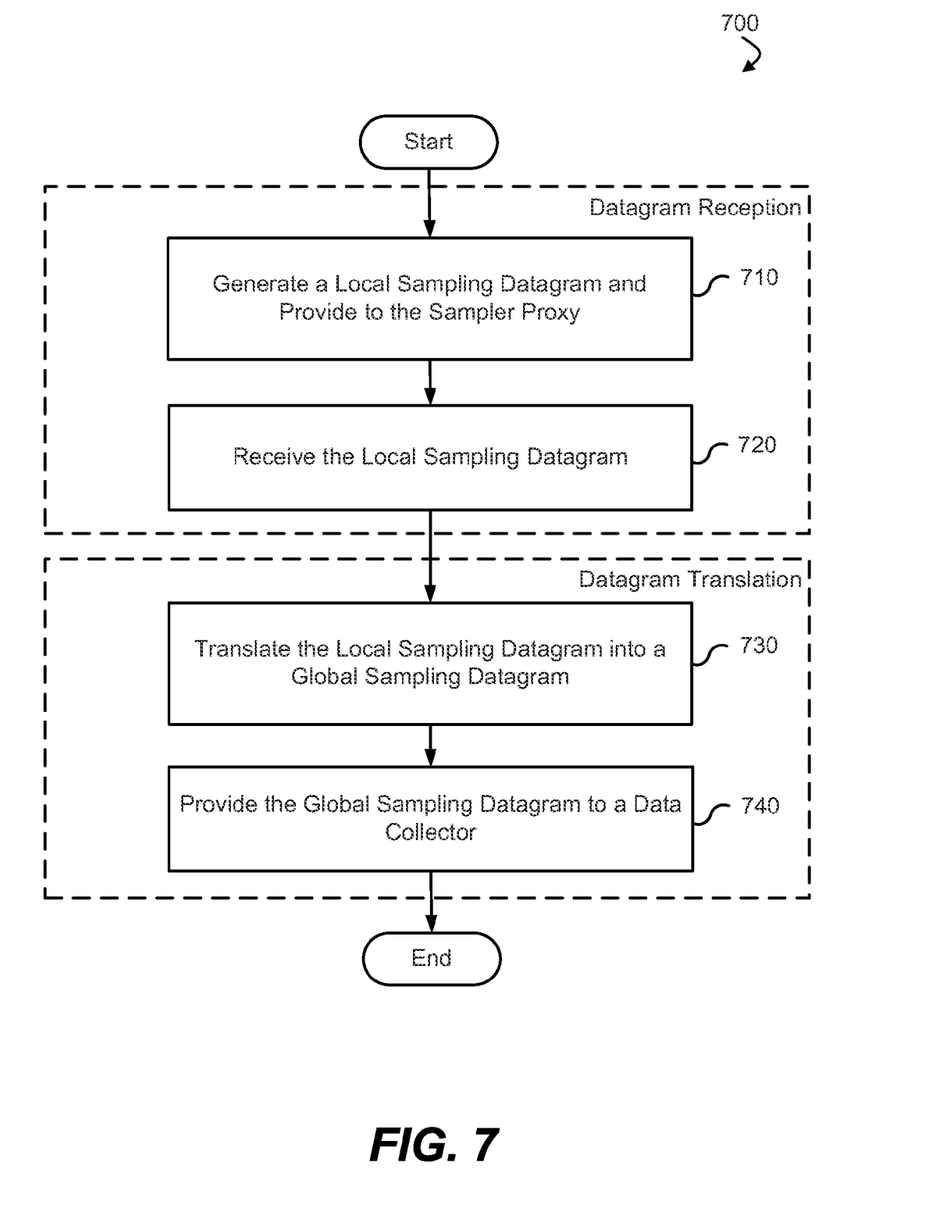
FIG. 7 is a process flow diagram for datagram reception and translation in a data path in accordance with an embodiment of the invention.

FIG. 7 is a process flow diagram for datagram reception and translation in a data path in accordance with an embodiment of the invention. The depicted process flow 700 may be carried out by execution of one or more sequences of executable instructions. In another embodiment, the process flow 700 is carried out by components of a network device and/or sampler proxy, an arrangement of hardware logic, e.g., an Application-Specific Integrated Circuit (ASIC), etc.

At step 710, a local sampling datagram is generated and provided to the sampler proxy. In one embodiment, traffic information, such as flow samplers and counter pollers, are captured at a remote network device according to a sampling configuration. The local sampling datagram is generated based on the captured traffic information. The datagram may be implemented as an sFlow packet (i.e., an sFlow packet including flow samplers and/or counter pollers). From the perspective of the remote network devices, the sampler proxy is configured to act as a collector. As such, the local sampling datagrams from various remote network devices are sent to the sampler proxy, rather than being sent directly to the correct data collector.

In one embodiment, the sFlow packet may vary from the sFlow standard. For example, an agent IP address field may have a different meaning from the standard. The agent IP address field may have the network address of the sampler proxy instead of the data collector. Moreover, an agent address type field, a sequence number field, and a system uptime field are fields that are populated with data that is local to the sampling agent, and therefore may be translated by the sampler proxy before forwarding to the correct data collector.

At step 720, the local sampling datagram is received by the sampler proxy. Translation may be performed. At step 730, the local sampling datagram is translated into a global sampling datagram. Translation is further described with relation to FIG. 8.

The global sampling datagram is provided to a data collector, at step 740. As previously described, the sampler proxy may be operatively coupled to a plurality of data collectors. The correct collector which is to receive the sampled traffic data is the collector that established the configuration which lead to the generation of the particular datagram. In other words, when multiple data collectors are involved, each data collector receives the sampled traffic data corresponding with its own configuration.

Datagram Translation

Figure 8:
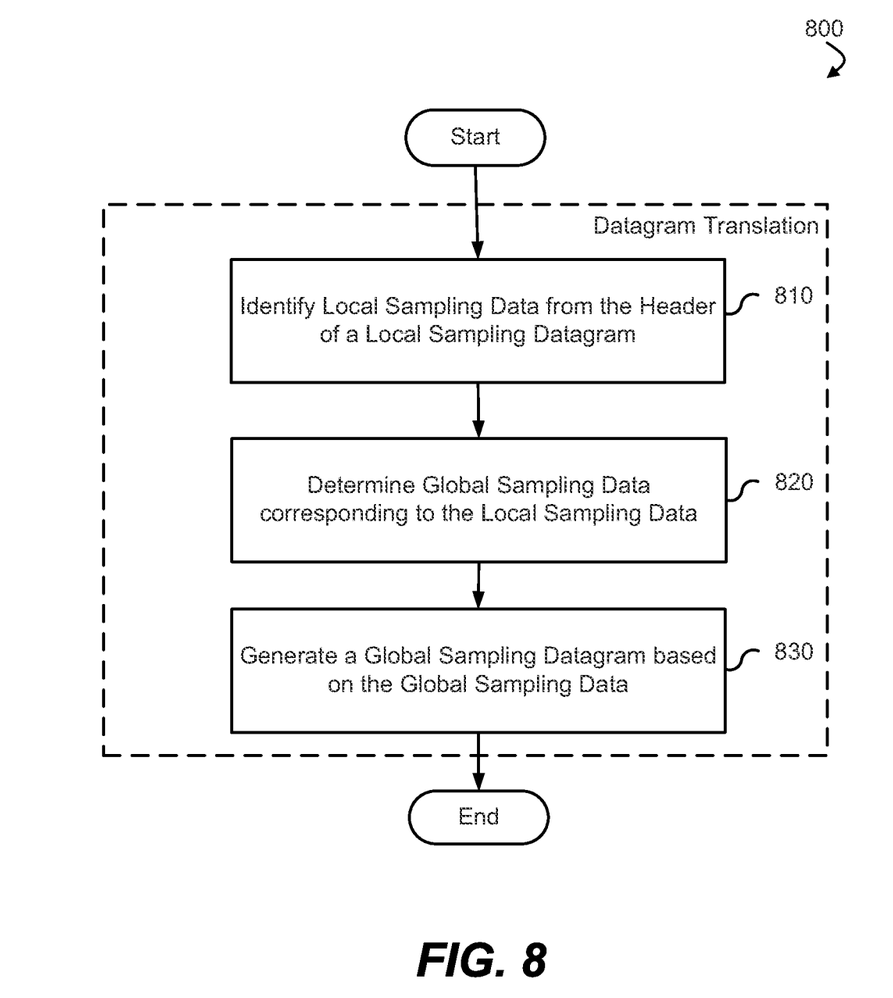
FIG. 8 is a process flow diagram for datagram translation in accordance with an embodiment of the invention.

FIG. 8 is a process flow diagram for datagram translation in accordance with an embodiment of the invention. The depicted process flow 800 may be carried out by execution of one or more sequences of executable instructions. In another embodiment, the process flow 800 is carried out by components of a sampler proxy, an arrangement of hardware logic, e.g., an Application-Specific Integrated Circuit (ASIC), etc.

At step 810, local sampling data is identified from the header of a local sampling datagram. In one embodiment, the local sampling data includes those fields of the local sampling datagram which have a different meaning from the standard and/or which are populated with data that is local to a sampling agent. For example, the local sampling data includes the following fields of an sFlow packet: an agent address type field, and agent IP address field, a sequence number field, and a system uptime field.

At step 820, global sampling data corresponding to the local sampling data is determined. In one embodiment, the local sampling data is modified to comply with the protocol standard, such as sFlow. The global sampling data may be determined using a mapping table, such as mapping table 410, and/or known according to the protocol such as sFlow.

At step 830, a global sampling datagram is generated based on the global sampling data. The global sampling data replaces the local sampling data, thus generating the global sampling datagram.

In one embodiment, the local sampling data includes a network address field (e.g., agent IP address). The corresponding global sampling data includes the network address of the sampler proxy. As such, the value in the network address field of the datagram is replaced with the network address of the sampler proxy.

For example, the agent IP address field is initially populated with a network address of a data collector. The corresponding global sampling data includes the network address of the sampler proxy. The network address of the data collector may be replaced with the network address of the sampler proxy.

Figure 9:
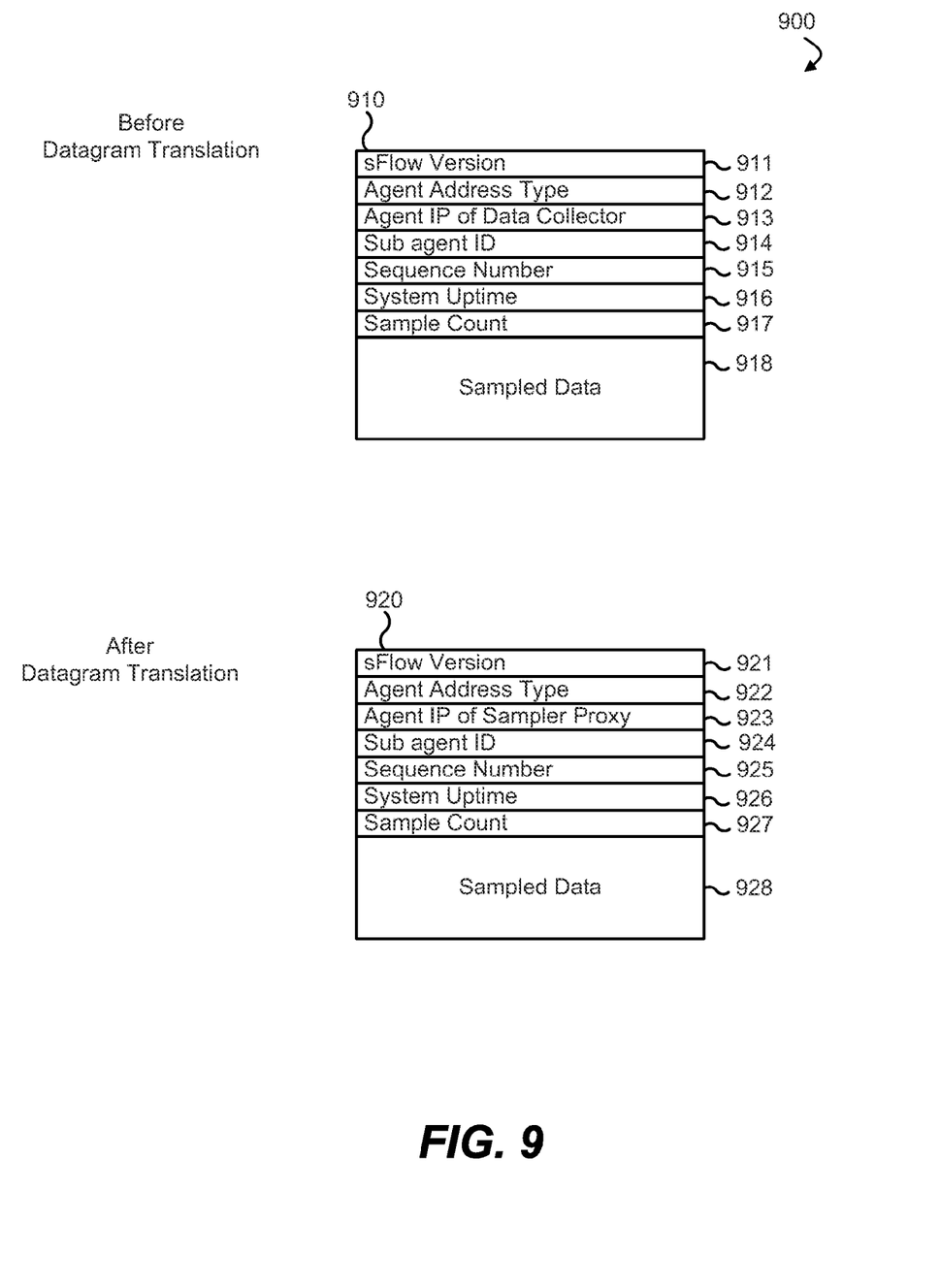
FIG. 9 is a diagram of an exemplary datagram before and after datagram translation in accordance with an embodiment of the invention.

FIG. 9 is a diagram 900 of an exemplary datagram before and after datagram translation in accordance with an embodiment of the invention. Datagram 910 is an exemplary IPv4 sFlow datagram before datagram translation by a sampler proxy, such as an sFlow proxy. Datagram 910 includes an sFlow header and payload. The header includes various fields such as sFlow version 911, agent address type 912, agent IP address 913, sub agent ID 914, sequence number 915, system uptime, 916, and sample count 917. The payload includes sampled data 918.

Datagram 910 may include fields in the header that may be modified by the sFlow proxy prior to being forwarded to a correct sFlow collector. Some fields may not comply with the sFlow standard described in RFC-3176 and as such may be modified.

Datagram 920 is an exemplary IPv4 sFlow datagram after datagram translation by the sFlow proxy. Datagram 920 includes sampled data 928 in the payload. Datagram 920 includes in the sFlow header various fields such as sFlow version 921, agent address type 922, agent IP address 923, sub agent ID 924, sequence number 925, system uptime 926, and sample count 927.

In one embodiment, the following fields may have been modified during datagram translation: agent address type 922, agent IP address 923, sub agent ID 924, sequence number 925, system uptime, 926, and sample count 927. For example, the agent IP address 913 field in datagram 910 may be modified by replacing an IP address of a data collector with the IP address of the sFlow proxy. Upon receipt of a translated datagram, such as datagram 920, it appears to an sFlow collector that the datagram is received by a single device (i.e., sFlow proxy) having multiple data sources.

Figure 10:
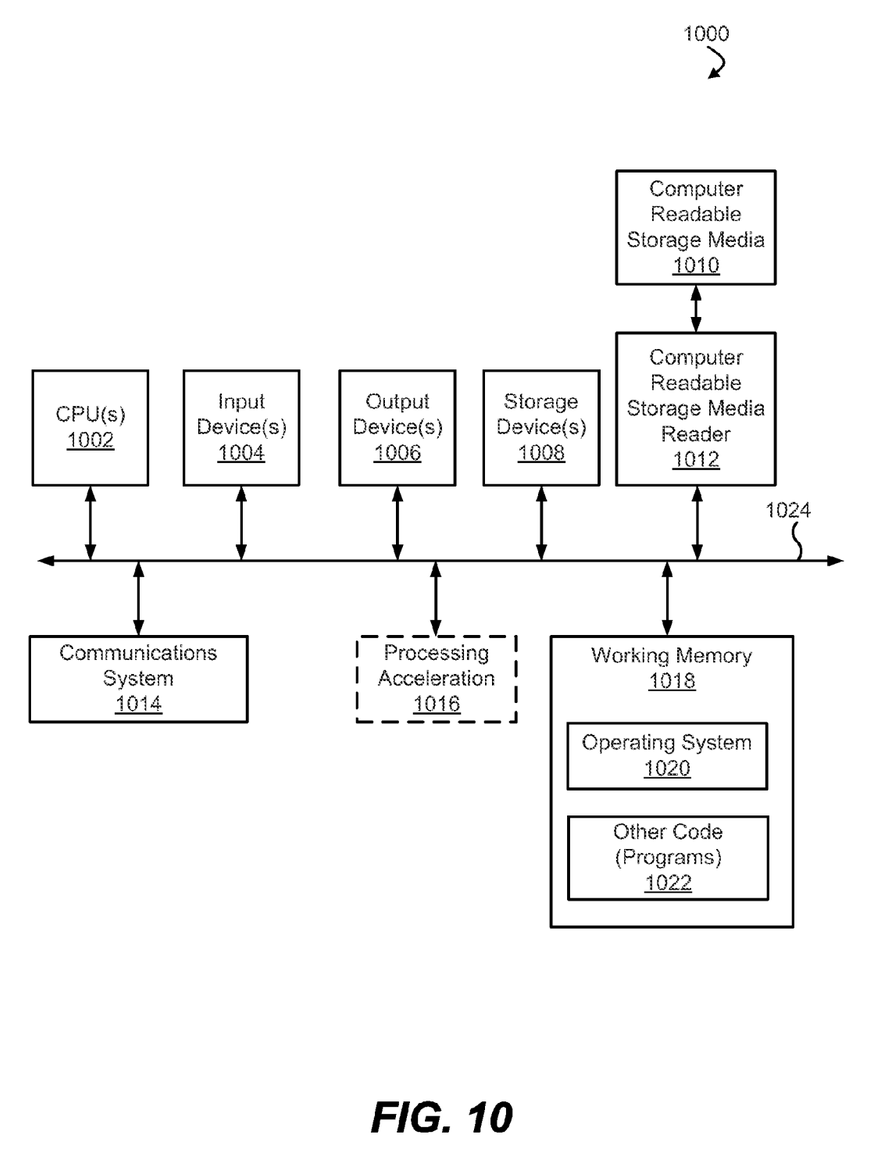
FIG. 10 illustrates an exemplary computer system in which various embodiments of the present invention may be implemented.

FIG. 10 illustrates an exemplary computer system 1000 in which various embodiments of the present invention may be implemented. The system 1000 may be used to implement any of the computer systems described above. The computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). The computer system 1000 may also include one or more storage devices 1008. By way of example, the storage device(s) 1008 can include devices such as disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1012, a communications system 1014 (e.g., a modem, a network card (wireless or wired), an infra-red communication device, etc.), and working memory 1018, which may include RAM and ROM devices as described above. In some embodiments, the computer system 1000 may also include a processing acceleration unit 1016, which can include a digital signal processor DSP, a special-purpose processor, and/or the like.

The computer-readable storage media reader 1012 can further be connected to a computer-readable storage medium 1010, together (and in combination with storage device(s) 1008 in one embodiment) comprehensively representing remote, local, fixed, and/or removable storage devices plus storage media for temporarily and/or more permanently containing, storing, transmitting, and retrieving computer-readable information. The communications system 1014 may permit data to be exchanged with the network and/or any other computer described above with respect to the system 1000.

The computer system 1000 may also comprise software elements, shown as being currently located within a working memory 1018, including an operating system 1020 and/or other code 1022, such as an application program (which may be a client application, Web browser, mid-tier application, RDBMS, etc.). It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for storing a plurality of instructions, or portions of instructions, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method for management of sampled traffic data, the method comprising:
    for each network device of a plurality of network devices associated with a sampler proxy, determining at least one data source associated with the network device, wherein each of the data sources is identified by a device unique identifier identifying the network device, a local identifier, and a global identifier, wherein the global identifiers are unique across the data sources;
    receiving, by the sampler proxy, a global sampling configuration for a selected data source from a data collector, wherein the selected data source is identified in the global sampling configuration by the global identifier of the selected data source;
    translating, by the sampler proxy, the global sampling configuration to a local sampling configuration by mapping the global identifier of the selected data source to the corresponding device unique identifier and the local identifier to determine a network address of the selected data source; and
    transmitting, by the sampler proxy, the local sampling configuration to the selected data source using the determined network address.

2. The method of claim 1, further comprising:
    assigning the global identifiers to the data sources associated with the plurality of network devices; and
    for each of the network devices, mapping the global identifier of each of the data sources to the local identifier of each of the data sources.

3. The method of claim 1, wherein translating the global sampling configuration further comprises:
    determining the global identifier of the selected data source from the global sampling configuration;
    determining a network address of the network device of the plurality of network devices corresponding to the global identifier of the selected data source from the global sampling configuration;
    determining the local identifier of the data source corresponding to the global identifier of the selected data source from the global sampling configuration; and
    generating the local sampling configuration based on the network address of the network device corresponding to the global identifier and the local identifier corresponding to the global identifier of the selected data source.

4. The method of claim 1, further comprising:
    receiving a local sampling datagram from the selected data source of the network device of the plurality of network devices;
    translating the local sampling datagram to a global sampling datagram; and
    providing the global sampling datagram to the data collector.

5. The method of claim 4, wherein translating the local sampling datagram further comprises:
    inserting a network address of the sampler proxy in an address field of the local sampling datagram; and
    modifying one of more fields of the local sampling datagram populated with local data.

6. A system for management of sampled traffic data, the system comprising:
    a processor; and
    a memory coupled to the processor, the memory having machine-readable instructions that when executed are to cause the processor to:
        for each network device of a plurality of network devices associated with a sampler proxy, determine at least one data source associated with the network device, wherein each of the data sources is assigned a respective local identifier;
        receive, by the sampler proxy, a global sampling configuration from a data collector in the local network, the global sampling configuration including a selected data source associated with a network device of the plurality of network devices, wherein the selected data source is identified by a global identifier of the selected data source;
        translate the global sampling configuration to a local sampling configuration; and
        provide the local sampling configuration to the selected data source.

7. The system of claim 6, wherein the machine-readable instructions are further to cause the processor to:
    assign a global identifier to each of the data sources; and
    map the global identifiers of each of the data sources to the respective local identifier of each of the data source.

8. The system of claim 6, wherein, to translate the global sampling configuration, the machine-readable instructions are further to cause the processor to:
    determine the global identifier of the selected data source from the global sampling configuration;
    determine a network address of the network device corresponding to the global identifier of the selected data source from the global sampling configuration;
    determine the local identifier of the selected data source corresponding to the global identifier of the selected data source from the global sampling configuration; and
    generate the local sampling configuration based on the network address of the network device corresponding to the global identifier and the local identifier corresponding to the global identifier of the selected data source.

9. The system of claim 6, wherein the machine-readable instructions are further to cause the processor to:
   receive a local sampling datagram from the selected data source;
   translate the local sampling datagram to a global sampling datagram; and
   provide the global sampling datagram to the data collector.

10. The system of claim 9, wherein to translate the local sampling datagram, the machine-readable instructions are further to cause the processor to:
    insert a network address of the sampler proxy in an address field of the local sampling datagram; and
    modify one of more fields of the local sampling datagram populated with local data.

11. A method for management of sampled traffic data in a network, the network comprising a local network and a remote network, the method comprising:
    for each network device of a plurality of network devices of the remote network associated with a sampler proxy, determining at least one data source associated with the network device, wherein each of the data sources is identified by a device unique identifier identifying the network device, a local identifier identifying each data source within the network device, and a global identifier that is unique across the data sources;
    receiving, by the sampler proxy, a global sampling configuration for a selected data source from a data collector of the local network, wherein the global sampling configuration includes a selected data source of a network device of the plurality of network devices, wherein the selected data source is identified in the global sampling configuration by the global identifier of the selected data source;
    translating, by the sampler proxy, the global sampling configuration to a local sampling configuration by mapping the global identifier of the selected data source in the global sampling configuration to the corresponding the device unique identifier and the local identifier to determine a network address of the selected data source; and
    transmitting, by the sampler proxy, the local sampling configuration to the selected data source.

12. The method of claim 1, further comprising:
    for each network device of the plurality of network devices, assigning the global identifiers to the data sources associated with the plurality of network devices; and
    for each network device of the plurality of network devices, mapping the global identifier of each of the data sources to the local identifier of each of the data sources.

13. The method of claim 11, wherein translating the global sampling configuration further comprises:
    determining the global identifier of the selected data source from the global sampling configuration;
    determining the device unique identifier of the network device corresponding to the global identifier of the selected data source from the global sampling configuration;
    determining the local identifier of the data source corresponding to the global identifier from the global sampling configuration; and
    generating the local sampling configuration based on the unique identifier of the network device corresponding to the global identifier and the local identifier corresponding to the global identifier of the selected data source.

14. The method of claim 11, further comprising:
    generating a local sampling datagram by the selected data source;
    translating the local sampling datagram to a global sampling datagram; and
    providing the global sampling datagram to the data collector of the local network.

15. The method of claim 14, wherein translating the local sampling datagram further comprises:
    inserting a network address of the sampler proxy in an address field of the local sampling datagram; and
    modifying a field of the local sampling datagram populated with local data.

* * * * *